3,412,133
ALKYL CARBONATE ESTERS OF 2,6-DINITRO-4-BRANCHED ALKYL-PHENOLS
Max Pianka, St. Albans, and John Duncan Edwards, Luton, England, assignors to The Murphy Chemical Company Limited, St. Albans, England, a British company
No Drawing. Filed Aug. 2, 1965, Ser. No. 476,707
Claims priority, application Great Britain, Aug. 7, 1964, 32,306/64; July 14, 1965, 29,892/65
18 Claims. (Cl. 260—463)

ABSTRACT OF THE DISCLOSURE

There are provided compounds of the formula

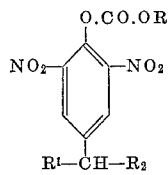

in which R is an alkyl group of from 1–12 carbon atoms, which may be branched, and in which $R^1$ and $R^2$ are n-alkyl groups containing from 2 to 5 carbon atoms each, and together containing a total of 6 to 10 carbon atoms. The compounds display mildewicidal activity.

---

This invention is concerned with improvements in or relating to pesticides.

In United States application No. 180,013, filed March 15, 1962 which matured to Patent No. 3,234, 260, there are described and claimed novel pesticides of the general formula

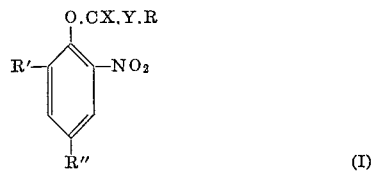

in which X and Y are the same or different and each is an oxygen or sulphur atom, R is inter alia an alkyl group and one of R' and R" is a nitro group and the other is a branched aliphatic hydrocarbon group having 4 to 8 carbon atoms, a phenyl, substituted phenyl, cyclohexyl or substituted cyclohexyl group.

It has now been found that certain 2,6-dinitrophenyl carbonates, some of which fall within the general Formula I but are not specifically disclosed in said application, have good fungicidal properties. In particular certain of the carbonates of the present invention have mildewicidal activity which is higher than that of the specific compounds disclosed in said application.

A further advantage of the compounds of the present invention is that they have low phytoxicity and in particular they are in general less phytotoxic than the corresponding parent dinitroalkylphenols.

According to the present invention therefore there are provided compounds of the general formula:

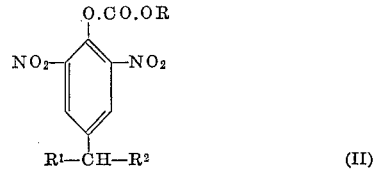

in which R is an alkyl group, which may be branched, and in which $R^1$ and $R^2$ are n-alkyl groups containing from 2 to 5 carbon atoms each, and together containing a total of 6 to 10 carbon atoms.

The group R may contain from 1–12 carbon atoms but preferably contains 1–4 carbon atoms only. It may thus be methyl, ethyl, propyl, isopropyl, butyl or isobutyl. Particularly preferred compounds are however those where R is methyl or ethyl. The methyl carbonate esters have excellent mildewicidal activity and the ethyl carbonate esters also have a high level of activity.

The group $R^1.(R^2)CH$ is thus either an n-hexyl group which is α-substituted by an ethyl, n-propyl, n-butyl or n-pentyl group, an n-butyl group which is α-substituted by an n-propyl group, or an n-pentyl group which is α-substituted by an ethyl, n-propyl or n-butyl group.

Various methods have been proposed for the preparation of dinitro derivatives of hydrocarbon-substituted phenols but in many cases the products were mixtures of isomers. These mixtures included both position isomers and also isomers of the hydrocarbon side chain. Therefore, whichever method is adopted to prepare the alkyl phenols and their dinitro derivatives which are used to prepare the carbonates of the present invention, care should be taken to ensure that the desired compound is obtained.

The compounds of the present invention may be prepared by reacting a compound of the general formula:

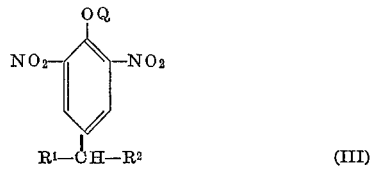
(III)

in which Q represents a hydrogen or an alkali metal atom, preferably sodium or potassium, and $R^1$ and $R^2$ have the above defined meanings, with a haloformic acid ester of the formula:

$$Z.CO.OR \qquad (IV)$$

where Z is chlorine, bromine or iodine, preferably chlorine, and R has the above defined meaning, the reaction being effected in the presence of an acid binding agent, e.g. an alkali metal carbonate, an alkali metal bicarbonate or a tertiary amine (e.g. pyridine), where Q represents a hydrogen atom. In practice the reaction is conveniently effected in solution in an inert organic solvent e.g. a ketone such as acetone.

The phenoxide of Formula III (where Q is an alkali metal) may be preformed, or, preferably may be formed in situ in an inert organic solvent prior to introduction of the haloformic acid ester by reaction of the parent phenol V with a suitable alkali metal compound, e.g. the hydroxide carbonate or bicarbonate.

The preparation of the compounds according to the invention by the reaction of the phenoxide of general Formula III with a compound of general Formula IV is particularly advantageous since the use of the phenoxide in place of the parent phenol V and a tertiary base leads, in general, to a more economic process.

However, another advantageous method of preparing the compounds according to the invention comprises the simultaneous reaction of the parent phenol V with a haloformic acid ester IV in an inert organic solvent (e.g. a ketone such as acetone) in the presence of an alkali metal carbonate or alkali metal bicarbonate, preferably an alkali metal carbonate. This process also in general gives a more economic process as compared with the use of the parent phenol V and a tertiary base. The use of alkali metal carbonates or alkali metal bicarbonates is preferred.

The haloformic acid esters IV may conveniently be prepared by reaction of a compound of the formula ROH with a compound of the formula $COZ_2$ according to the equation:

$$ROH + COZ_2 \rightarrow Z.CO.O.R + HZ.$$

Thus, the chloroformic acid esters may be produced by the following reaction:

$$ROH + COCl_2 Cl.COOR + HCl$$

In general, this reaction may be carried out in the presence of aluminium chloride as catalyst and where required in the presence of an acid binding agent.

The parent dinitro-alkyl phenols:

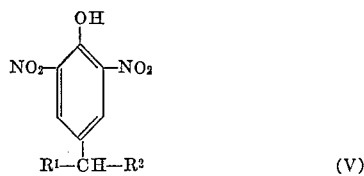

where $R^1$ and $R^2$ have the meanings given above, may be prepared by dinitration of the corresponding alkylphenols. This dinitration may be carried out by any convenient method. However, a preferred method comprises adding the 4-alkyl phenol in solution in an inert organic solvent, particularly a hydrocarbon or a halogenated hydrocarbon solvent, to agitated aqueous nitric acid containing at least two equivalents of nitric acid; on completion of the addition raising the temperature of the reaction mixture to further the nitration; cooling the reaction mixture when the reaction is essentially complete and recovering the nitrated phenol.

Alkyl phenols analogous to those used to prepare the carbonates of the present invention have been prepared by reacting phenol with an alkylating agent, e.g. an alkene or a mixture of an alkanol and a dehydrating agent. Using this process the alkylated product is a mixture of 2- and 4-alkyl phenols and further, a mixture of alkyl side chain isomers. To obtain substantially pure 4-alkyl phenol having the desired side chain structure it is necessary to fractionate the mixture e.g. by distillation before or after nitration.

One method of preparing the 4-alkyl phenols involves reacting a p-hydroxybenzoketone with an appropriate alkylmagnesium halide, to yield a tertiary carbinol, dehydration of the carbinol, followed by catalytic hydrogenation of the resultant olefin e.g. using palladium/charcoal in ethanol. Dehydration may occur spontaneously during heating or may be effected by the use of an acid catalyst e.g. potassium hydrogen sulphate, p-toluene sulphonic acid or sulphuric acid. Such a procedure ensures that the 4-alkyl group is branched in the precise manner desired. In some cases it may be advantageous to use the methyl ether of the benzoketone to improve solubility in the reaction solvent and/or to avoid side reactions, demethylation being carried out after reduction of the olefin.

The compounds according to the invention may be formulated for use in any desired way. Generally, such formulations will include at least one such compound in association with a suitable carrier or diluent. If desired, there may be used in addition to such compound(s) one or more further pesticides e.g. other fungicides, acaricides or insecticides. Such carriers may be liquid or solid and designed to aid the application of the compound either by way of dispersing it where it is to be applied or to provide a formulation which can be made by the user into a dispersible preparation.

Liquid preparations thus include preparations of the compound in the form of solutions or emulsions which can be used on their own or be adapted to be made up with water or other diluents to form sprays etc.; in such cases the carrier is a solvent or emulsion base which is non-phytotoxic under the conditions of use. Generally such preparations will include a wetting, dispersing or emulsifying agent. Other liquid preparations include aerosols in which the compound is associated with a liquid carrier or propellant.

Solid preparations include dusts and wettable powders, granulates and pellets, and semi-solid preparations such as pastes. Such preparations may include inert solid or liquid diluents such as clays, which may themselves have wetting properties, and/or wetting, dispersing or emulsifying agents; binding and/or adhesive agents may also be included. Solid preparations also include thermal fumigating compositions wherein the compound is associated with a solid pyrotechnic component.

In order that the invention may be well understood the following examples are given by way of illustration only.

Preparation of alkyl phenols

The preparation of alkyl phenols was carried out as described above using an alkyl magnesium halide and a hydroxyphenylketone or methoxyphenylketone followed by treatment with potassium hydrogen sulphate to give an olefin and reduction of the olefin by hydrogenation using palladium/charcoal in ethanol. Where it was necessary to use the anisole derivatives, methylation was carried out in a conventional manner using dimethylsulphate on the hydroxy ketone. The final demethylation was effected by heating with hydrobromic acid in acetic acid to give the phenol.

A typical preparation of an alkyl phenol is as follows:

Preparation of 4-(1-n-propyl-n-butyl)phenol (1) Preparation of 4-(1-n-propyl-n-butenyl)anisole.—n-Propyl bromide (42 g.) in sodium-dried ether (50 ml.) was added dropwise to magnesium (7.0 g.) covered with sodium-dried ether (100 ml.) at such a rate as to maintain a vigorous reflux. After the addition the reflux was maintained for a further 1½ hrs., then p-methoxy-n-butyrophenone (45 g.) in sodium-dried ether (40 ml.) was added dropwise with stirring at a rate sufficient to maintain the reflux. After the addition the reaction mixture was heated under reflux for 3 hrs., then cooled and poured onto crushed ice, and acidified with an excess of dilute sulphuric acid. The ether layer was separated, washed with water and distilled on a steam-bath at 20 mm. Concentrated sulphuric acid (9 drops) was added to the residue from the distillation, which was then heated at about 50° C. overnight. Ether and dilute sodium hydroxide were added to the cooled mixture and the ether solution was separated, washed with water and dried over sodium sulphate. The dried solution was filtered and distilled to give 4-(1-n-propyl-n-butenyl)anisole (41.9 g., 81%), B.P. 145–150° C./17 mm., $n_D^{20}$ 1.5239. (Found: C, 82.08; H, 9.87. $C_{14}H_{20}O$ requires C, 82.35; H, 9.80%.)

(2) Preparation of 4-(1-n-propyl-n-butyl)anisole.—4-(1-n-propyl-n-butenyl)anisole (41 g.) in absolute alcohol (25 ml.) was added to a suspension of a 10% palladium on charcoal catalyst (2 g.) in absolute alcohol (25 ml.) and the mixture hydrogenated at about atmospheric pressure. When the hydrogen uptake had ceased, the catalyst was filtered off and the filtrate distilled to give 4-(1-n-propyl-n-butyl)anisole (37.1 g., 90%), B.P. 139–143° C./15 mm., $n_D^{20}$ 1.4950. (Found: C, 81.42; H, 10.61. $C_{14}H_{22}O$ requires C, 81.55; H, 10.68%).

(3) Demethylation of 4-(1-n-propyl-n-butyl)anisole to give 4-(1-n-propyl-n-butyl)-phenol.—4-(1-n-propyl - n-butyl)anisole (36 g.) was dissolved in a mixture of glacial acetic acid (250 ml.) and 47% aqueous hydrobromic acid (160.8 g.). The mixture was heated under reflux for 11 hrs., cooled and extracted with light petroleum (B.P. 40–60° C., 2 portions, 100 ml., 50 ml.). The petroleum solution was washed with water, then with 2 portions (100 ml.) of a mixture of 25% w./v. aqueous NaOH (50 ml.) and methanol (50 ml.). The combined alkaline extracts were washed with light petroleum (B.P. 40–60° C., 100 ml.), then acidified with concentrated hydrochloric acid. The liberated phenol was extracted with petroleum (B.P. 40–60° C., 2 portions, 100 ml., 50 ml.) and the petroleum solution was washed with water, dried ($Na_2SO_4$) and distilled to give 4-(1-n-propyl-n-butyl)-phenol (31.35 g., 93.4%), B.P. 156–160° C. (mainly 158–159° C.)/19 mm., solidifying to needles M.P. 61–64° C. (softening at 57° C.). (Found: C, 81.17; H, 10.35. $C_{13}H_{20}O$ requires C, 81.25; H, 10.42%).

Table I gives the characteristics of the resulting 4-alkyl phenols.

washed with water, dried over anhydrous sodium sulphate, filtered, the petroleum was removed from the filtrate. 4-(1-n-propyl-n-hexyl)-2,6-dinitrophenol was obtained as an oil (14.9 g.).

Table II shows the physical characteristics of this and other dinitroalkyl phenols also prepared via their cyclohexylamine salts.

TABLE II

| 4-alkyl substituent of the 2,6-dinitrophenol | M.P. of cyclohexylamine salt [1] | Refractive index of phenol | Empirical formula | N (percent) | |
|---|---|---|---|---|---|
| | | | | Found | Required |
| 1-n-propyl-n-butyl | 197–199° | $n_D^{20}$ 1.5528 | $C_{13}H_{18}N_2O_5$ | 9.8 | 9.9 |
| 1-ethyl-n-pentyl | 171–172° | $n_D^{20}$ 1.5526 | $C_{13}H_{18}N_2O_5$ | 10.2 | 9.9 |
| 1-n-propyl-n-pentyl | 179.5–181° | $n_D^{20}$ 1.5482 | $C_{14}H_{20}N_2O_5$ | 9.25 | 9.46 |
| 1-n-butyl-n-pentyl | 184–185° | $n_D^{20}$ 1.5435 | $C_{15}H_{22}N_2O_5$ | | 9.03 |
| 1-ethyl-n-hexyl | 164–166° | $n_D^{20}$ 1.5464 | $C_{14}H_{20}N_2O_5$ | 9.88 | 9.46 |
| 1-n-propyl-n-hexyl | 165–166° | $n_D^{20}$ 1.5424 | $C_{15}H_{22}N_2O_5$ | 8.95 | 9.03 |
| 1-n-butyl-n-hexyl | 180–182° | $n_D^{20}$ 1.5382 | $C_{16}H_{24}N_2O_5$ | 8.95 | 8.64 |
| 1-n-pentyl-n-hexyl | 183–184° | $n_D^{20}$ 1.5345 | $C_{17}H_{18}N_2O_5$ | 8.22 | 8.30 |

[1] Recrystallized from aqueous isopropanol.

C. Preparation of carbonates

The carbonates were all prepared from the corresponding 2,6-dinitro-4-alkyl phenols. The physical characteristics of the carbonates of the examples are given in Table III. In the table the groups R, $R^1$ and $R^2$ refer to the substituents in the formula

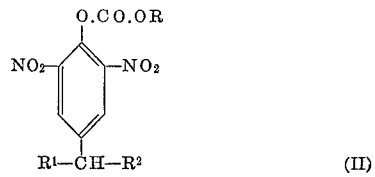

(II)

TABLE I

| 4-alkyl substituent of the phenol | B.P. | Refractive index $n_D$ | Empirical formula | Analysis, percent | | | |
|---|---|---|---|---|---|---|---|
| | | | | Found | | Required | |
| | | | | C | H | C | H |
| 1-n-propyl-n-butyl | 158–159, 19mm | Solid, M.P. 61–64° C | $C_{13}H_{20}O$ | 81.17 | 10.35 | 81.25 | 10.42 |
| 1-ethyl-n-pentyl | 154–155, 15 mm | 1.5105 (17) | $C_{13}H_{20}O$ | 81.33 | 10.15 | 81.25 | 10.42 |
| 1-n-propyl-n-pentyl | 124–125, 1.8 mm | Solid, M.P. 36–37° C | $C_{14}H_{22}O$ | 81.84 | 10.97 | 81.55 | 10.68 |
| 1-n-butyl-n-pentyl | 180, 20 mm | Solid, M.P. 55° C | $C_{15}H_{24}O$ | 81.06 | 10.93 | 81.82 | 10.91 |
| 1-ethyl-n-hexyl | 153–154, 10 mm | 1.5070 (18) | $C_{14}H_{22}O$ | 79.16 | 10.25 | 81.55 | 10.68 |
| 1-n-propyl-n-hexyl | 167, 12 mm | 1.5031 (21) | $C_{15}H_{24}O$ | 81.61 | 10.88 | 81.82 | 10.91 |
| 1-n-butyl-n-hexyl | 186–187, 11 mm | 1.5008 (20) | $C_{16}H_{26}O$ | 82.05 | 10.92 | 82.06 | 11.11 |
| 1-n-pentyl-n-hexyl | 131.5–132, 0.45 mm | 1.5017 (20) | $C_{17}H_{28}O$ | 81.87 | 10.77 | 82.24 | 11.29 |

B. Preparation of dinitroalkylphenols

Preparation of 4 - (1 - n - propyl - n - hexyl) - 2,6 - dinitrophenol.—To 4-(1-n-propyl-n-hexyl)-phenol (19.2 g.) in ethylene dichloride (34.1 ml.) a mixture of conc. nitric acid (69–72% $HNO_3$; 22.5 ml.) and water (22.5 ml.) was added. The mixture was heated under reflux for 1½ hrs. The ethylene dichloride layer was separated off, washed with saturated aqueous sodium sulphate solution, dried over anhydrous sodium sulphate and filtered. The ethylene dichloride was removed from the dried solution. The residue was dissolved in light petroleum (B.P. 40–60°, 125 ml.). Cyclohexylamine (15 ml.) was added and the mixture refrigerated. The orange coloured crystals that separated were filtered off (24 g.), M.P. 162–164°. After recrystallisation from 33% aqueous isopropanol the salt had M.P. 165–166° (20.7 g.). It was dissolved in methanol and the solution acidified with conc. hydrochloric acid. The mixture was diluted with water and the brown oil that precipitated was extracted with light petroleum, B.P. 60–80°. The petroleum extract was $R^1$ and $R^2$ having the above definitions, the R groups being n-alkyl unless otherwise shown. In each instance the substances were oils ranging in colour from golden to red-brown. A typical preparation of a carbonate ester is the following for the compound of Example 26.

2,6-dinitro-4-(1-ethylhexyl)phenol (2.07 g.), potassium carbonate (0.48 g.) and acetone (10 ml.) were heated under reflux for 30 mins. Ethyl chloroformate (0.84 g.) was added to the resulting solution and the mixture heated under reflux for 2 hrs. and 45 min. A precipitate of potassium chloride was filtered off. The acetone was removed from the filtrate and the residue was dissolved in benzene and shaken with aqueous 2 N sodium carbonate. The benzene solution was washed with water, and dried over anhydrous sodium sulphate. The dried solution was filtered off and the benzene removed from the filtrate under reduced pressure to leave 2,6-dinitro-4-(1-ethylhexyl)phenyl ethyl carbonate, a yellow oil (1.85 g.).

TABLE III

| Ex. No. | R | R¹ | R² | Refractive index ($n_D^{20}$) | Empirical formula | Analysis N (percent) Found | Analysis N (percent) Required |
|---|---|---|---|---|---|---|---|
| 1 | $CH_3$ | $C_2H_5$ | $C_4H_9$ | 1.5188 | $C_{15}H_{20}N_2O_7$ | 8.15 | 8.24 |
| 2 | $C_2H_5$ | $C_2H_5$ | $C_4H_9$ | 1.5148 | $C_{16}H_{22}N_2O_7$ | 8.16 | 7.91 |
| 3 | $CH_3$ | $C_3H_7$ | $C_3H_7$ | 1.5179 | $C_{15}H_{20}N_2O_7$ | 7.72 | 8.24 |
| 4 | $C_2H_5$ | $C_3H_7$ | $C_3H_7$ | 1.5127 | $C_{16}H_{22}N_2O_7$ | 7.43 | 7.91 |
| 5 | $CH_3$ | $C_3H_7$ | $C_5H_{11}$ | 1.5126 | $C_{17}H_{24}N_2O_7$ | 7.85 | 7.61 |
| 6 | $C_2H_5$ | $C_3H_7$ | $C_5H_{11}$ | 1.5085 | $C_{18}H_{26}N_2O_7$ | 7.43 | 7.33 |
| 7 | $CH_3$ | $C_3H_7$ | $C_4H_9$ | 1.5131 | $C_{16}H_{22}N_2O_7$ | 7.90 | 7.91 |
| 8 | $C_2H_5$ | $C_3H_7$ | $C_4H_9$ | 1.4995 | $C_{17}H_{24}N_2O_7$ | 7.81 | 7.61 |
| 9 | $CH_3$ | $C_4H_9$ | $C_5H_{11}$ | 1.5102 | $C_{18}H_{26}N_2O_7$ | 7.31 | 7.33 |
| 10 | $C_2H_5$ | $C_4H_9$ | $C_5H_{11}$ | 1.5063 | $C_{19}H_{28}N_2O_7$ | 7.03 | 7.07 |
| 11 | Sec.-Bu | $C_3H_7$ | $C_4H_9$ | 1.5033 | $C_{19}H_{28}N_2O_7$ | 7.01 | 7.07 |
| 12 | $CH_3$ | $C_4H_9$ | $C_4H_9$ | ¹ 1.5132 | $C_{17}H_{24}N_2O_7$ | 8.1 | 7.61 |
| 13 | $C_2H_5$ | $C_4H_9$ | $C_4H_9$ | 1.5085 | $C_{18}H_{26}N_2O_7$ | 7.65 | 7.33 |
| 14 | $CH_3$ | $C_5H_{11}$ | $C_5H_{11}$ | 1.5072 | $C_{19}H_{28}N_2O_7$ | 7.45 | 7.07 |
| 15 | $C_2H_5$ | $C_5H_{11}$ | $C_5H_{11}$ | 1.5040 | $C_{20}H_{30}N_2O_7$ | 7.52 | 6.83 |
| 16 | $C_3H_7$ | $C_2H_5$ | $C_5H_{11}$ | 1.5068 | $C_{18}H_{26}N_2O_7$ | 7.3 | 7.3 |
| 17 | $CH(CH_3)_2$ | $C_2H_5$ | $C_5H_{11}$ | $n_{D19}$ 1.5062 | $C_{18}H_{26}N_2O_7$ | 7.4 | 7.3 |
| 18 | $C_4H_9$ | $C_2H_5$ | $C_5H_{11}$ | 1.5049 | $C_{19}H_{28}N_2O_7$ | 7.1 | 7.1 |
| 19 | Sec.-Bu | $C_2H_5$ | $C_5H_{11}$ | 1.5030 | $C_{19}H_{28}N_2O_7$ | 7.0 | 7.1 |
| 20 | Iso.-Bu | $C_2H_5$ | $C_5H_{11}$ | 1.5035 | $C_{19}H_{28}N_2O_7$ | 6.9 | 7.1 |
| 21 | $C_6H_{13}$ | $C_2H_5$ | $C_5H_{11}$ | 1.5012 | $C_{21}H_{32}N_2O_7$ | 6.9 | 6.6 |
| 22 | $C_8H_{17}$ | $C_2H_5$ | $C_5H_{11}$ | 1.4930 | $C_{23}H_{36}N_2O_7$ | 6.2 | 6.2 |
| 23 | 1-Me-n-heptyl | $C_2H_5$ | $C_5H_{11}$ | 1.4927 | $C_{23}H_{36}N_2O_7$ | 6.7 | 6.2 |
| 24 | $C_{10}H_{21}$ | $C_2H_5$ | $C_5H_{11}$ | 1.4926 | $C_{25}H_{40}N_2O_7$ | 5.8 | 5.8 |
| 25 | $CH_3$ | $C_2H_5$ | $C_5H_{11}$ | $n_{D24}$ 1.5133 | $C_{16}H_{22}N_2O_7$ | 7.43 | 7.91 |
| 26 | $C_2H_5$ | $C_2H_5$ | $C_5H_{11}$ | $n_{D24}$ 1.5084 | $C_{17}H_{24}N_2O_7$ | 7.85 | 7.61 |

¹ Solidified to brown crystals, M.P. 40–42°.

As stated above the carbonates of the invention display mildewicidal activity. The results obtained in tests and the methods of testing are shown below.

The products were in all cases formulated using 25 g. of the active compound, 4 g. of calcium dodecyl benzene sulphonate, 4 g. of ethoxylated nonyl phenol and heavy naphtha to give 100 ml.

Apple mildew eradicant test

Apple rootstocks were kept in a cool greenhouse and allowed to become infected with apple mildew originating from infected rootstocks kept in the same house.

Before application of the toxicant dilution, the amount of mildew present on each rootstock was assessed by grading each leaf according to the percentage of the leaf area covered by apparently active mildew infection, the scale used being as follows:

| Grade | Percent of leaf area infected by mildew |
|---|---|
| 0 | No mildew present |
| 1 | 0–3 |
| 2 | 4–7 |
| 3 | 8–17 |
| 4 | 18–41 |
| 5 | 42–100 |

The mildew on the leaves was assessed up to a certain height of the apple rootstocks. A tag was placed above the uppermost leaf assessed to ensure that the same leaves would be assessed after treatment.

After assessment, the plants were divided up into four groups, to be considered as blocks in the experimental design, each group being as homogeneous as possible in respect of mildew infection of the plants. Within the groups a single plant for each treatment was used, making a total of four replicate plants per treatment. Spraying was by high volume hand sprayer, sufficient spray being applied to ensure thorough coverage. The sprays were prepared by diluting the formulation to give 20 p.p.m. of the test compound in the spray. To ensure good wetting, sodium dioctyl sulphosuccinate was included at 100 p.p.m. After spraying, the plants were arranged in the cool greenhouse to form four randomised blocks.

Four days later the mildew infection was again assessed; only the area of active mildew was taken into account.

The mean grade per leaf for the four replicates was calculated and these grades were used for the statistical analysis.

Differences between mean grades before treatment were not significantly great at the 5% level, so percentage control was calculated by comparing the mean grades per leaf (of the four replicates combined) for each treatment with the mean grade per leaf for the untreated rootstocks.

Barley mildew eradicant test

Pots containing 10 barley seedlings were kept in six groups, each group being considered as a block in the experimental design and containing one pot for each treatment. The seedlings were infected by blowing spores from infected plants over them, after all leaves except the oldest had been removed from each plant.

After the infection had developed sufficiently, the amount of mildew present was assessed by grading the leaves according to the scale given in the apple mildew test.

The plants were then treated by dipping for 15 seconds in a dilution containing the test compound at 20 p.p.m. and sodium dioctyl sulphosuccinate at 300 p.p.m.

After treatment the plants were kept in a cool greenhouse for four days, after which they were assessed using the same grades as previously. Active mildew only was assessed.

A mean grade per leaf was calculated for each replicate, and these grades were used for a statistical analysis. Since the differences between the mean grades before treatment were not significantly different at the 5% level, percentage control was calculated by comparing the mean grade per leaf (of the six replicates combined) with the mean grade per leaf of the untreated seedlings.

Cucumber mildew eradicant test

This followed the test described for apple mildew except that young cucumber plants with two leaves were used. The grading of mildew on the cucumber plants before infection was as follows:

| Grade | Percent of leaf area infected by mildew |
|---|---|
| 0 | No mildew present |
| 1 | 0.5 |
| 2 | 1 |
| 3 | 2 |
| 4 | 4 |
| 5 | 8 |
| 6 | 16 |
| 7 | 32 |
| 8 | ≧64 |

No wetting agent was added to the toxicant spray. The following results were obtained:

TABLE IV

| Compound of Example No. | Percentage eradication of mildew | | | |
|---|---|---|---|---|
| | Apple at— | | Barley at 20 p.p.m. | Cucumber at 50 p.p.m. |
| | 20 p.p.m. | 10 p.p.m. | | |
| 1 | 100 | 99.8 | 96 | 97 |
| 2 | 98 | 99.5 | 98 | |
| 3 | | | 99 | |
| 4 | | | 99 | |
| 5 | 99.9 | | 94 | 92 |
| 6 | 99.4 | | 91 | |
| 7 | 99.3 | | 99+ | 98 |
| 8 | 99.2 | | 99+ | |
| 9 | 100 | | 91 | |
| 10 | 99.6 | | 90 | |
| 12 | | 99 | | |
| 13 | | 98 | | |
| 14 | | 99.3 | | |
| 15 | | 98 | | |
| 16 | | | 97 | |
| 25 | | | 99.8 | |
| 20 | | | 96 | |
| 26 | | | 99.8 | |

We claim:
1. A compound of the formula

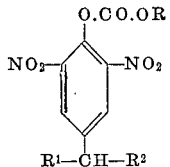

in which R is alkyl of from 1 to 4 carbon atoms and R¹ and R² are each n-alkyl of from 2 to 5 carbon atoms and together contain a total of 6 to 10 carbon atoms.

2. A compound as claimed in claim 1 in which the group

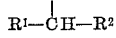

represents 1-ethyl-n-hexyl or 1-n-propyl-n-pentyl.

3. 2,6-dinitro-4-(1-ethyl-n-pentyl)phenyl methyl carbonate.
4. 2,6-dinitro-4-(1-ethyl-n-pentyl)phenyl ethyl carbonate.
5. 2,6-dinitro-4-(1-ethyl-n-hexyl)phenyl methyl carbonate.
6. 2,6-dinitro-4-(1-ethyl-n-hexyl)phenyl ethyl carbonate.
7. 2,6-dinitro-4-(1-n-propyl-n-butyl)phenyl methyl carbonate.
8. 2,6-dinitro-4-(1-n-propyl-n-butyl)phenyl ethyl carbonate.
9. 2,6-dinitro-4-(1-n-propyl-n-hexyl)phenyl methyl carbonate.
10. 2,6-dinitro-4-(1-n-propyl-n-hexyl)phenyl ethyl carbonate.
11. 2,6-dinitro-4-(1-n-propyl-n-pentyl)phenyl methyl carbonate.
12. 2,6-dinitro-4-(1-n-propyl-n-pentyl)phenyl ethyl carbonate.
13. 2,6 dinitro-4-(1-n-butyl-n-hexyl)phenyl methyl carbonate.
14. 2,6-dinitro-4-(1-n-butyl-n-hexyl)phenyl ethyl carbonate.
15. 2,6-dinitro-4-(1-n-butyl-n-pentyl)phenyl methyl carbonate.
16. 2,6-dinitro-4-(1-n-butyl-n-pentyl)phenyl ethyl carbonate.
17. 2,6-dinitro-4-(1-n - pentyl - n - hexyl)phenyl methyl carbonate.
18. 2,6-dinitro-4-(1-n-pentyl-n-hexyl)phenyl ethyl carbonate.

References Cited

UNITED STATES PATENTS 3,234,260  2/1966  Pianka et al. _____ 260—463

CHARLES B. PARKER, *Primary Examiner.*

L. C. MARUZO, *Assistant Examiner.*